US009753142B2

(12) United States Patent
Broussalian (10) Patent No.: US 9,753,142 B2
(45) Date of Patent: Sep. 5, 2017

(54) ANTI-SPOOFING IN A SATELLITE NAVIGATION SYSTEM

(71) Applicant: Exelis Inc., McLean, VA (US)

(72) Inventor: Michael L. Broussalian, Moorpark, CA (US)

(73) Assignee: Exelis Inc., McLean, VA (US)

( * ) Notice: Subject to any disclaimer, the term of this patent is extended or adjusted under 35 U.S.C. 154(b) by 900 days.

(21) Appl. No.: 14/049,646

(22) Filed: Oct. 9, 2013

(65) Prior Publication Data

US 2015/0097721 A1    Apr. 9, 2015

(51) Int. Cl.
*G01S 19/21* (2010.01)
*G01S 19/01* (2010.01)

(52) U.S. Cl.
CPC .......... *G01S 19/215* (2013.01); *G01S 19/015* (2013.01)

(58) Field of Classification Search
USPC ............ 342/357.2, 357.21, 357.46; 380/255, 380/259; 701/468
See application file for complete search history.

(56) References Cited

U.S. PATENT DOCUMENTS

2012/0121087 A1   5/2012   Psiaki

OTHER PUBLICATIONS

Pozzobon, et al., "Anti-Spoofing and Open GNSS Signal Authentication with Signal Authentication Sequences," 5th ESA Workshop on Satellite Navigation Technologies and European workshop on GNSS Signals and Signal Processing (NAVITEC), IEEE, pp. 1-6 (Dec. 2010).
Psiaki, et al., "Civilian GPS Spoofing Detection Based on Dual-Receiver Correlation of Military Signals," Proceedings of the 24th International Technical Meeting of the Satellite Division of the Institute of Navigation (ION GNSS 2011), pp. 2619-2645 (Sep. 2011).
European Search Report in corresponding Application No. 14187378.6, mailed Mar. 4, 2015.
Woo, K. T., "Optimum Semi-Codeless Carrier Phase Tracking of L2," Navigation, Journal of the Institute of Navigation, vol. 47, No. 2, Summer 2000, pp. 82-99.
Psiaki, Mark L. et al., "GPS Spoofing Detection via Dual-Receiver Correlation of Military Signals," IEEE Transactions on Aerospace and Electronic Systems, 2013, vol. 49, Issue 4, pp. 2250-2267.

*Primary Examiner* — Dao Phan
(74) *Attorney, Agent, or Firm* — Edell, Shapiro & Finnan LLC (57) ABSTRACT

Embodiments are generally directed to anti-spoofing techniques for satellite navigation systems. In general, the anti-spoofing techniques use codeless or semi-codeless tracking of encrypted satellite signals to generate measurements that can be used to perform consistency checks to received non-encrypted signals. The consistency checks will detect if the non-encrypted signal is a genuine satellite signal or a spoofing signal.

16 Claims, 5 Drawing Sheets

ANTI-SPOOFING IN A SATELLITE NAVIGATION SYSTEM

FIELD OF THE INVENTION

The present invention relates generally to the satellite navigation systems, and more particularly, to anti-spoofing in a satellite navigation system.

BACKGROUND

A satellite navigation system comprises a network of Earth-orbiting (space-based) satellites that provide time and location information to electronic receivers at or near the Earth. More specifically, the satellites in a satellite navigation system transmit radio signals along a line-of-sight that, when received by an electronic receiver, enable the electronic receiver to determine its location (e.g., longitude, latitude, and altitude) to within a range (e.g., a few yards, meters, etc.)

A satellite navigation system with global coverage is sometimes referred to as a global navigation satellite system (GNSS). As of April 2013, the United States NAVSTAR Global Positioning System (GPS) and the Russian Globalnaya navigatsionnaya sputnikovaya sistema (GLONASS) are the only fully globally operational GNSSs. However, China is in the process of expanding its regional Beidou navigation system into a global navigation system by 2020, while the European Union's Galileo positioning system is a GNSS in an initial deployment phase. Several other countries, including India, France, and Japan are in the process of developing regional navigation systems.

Satellite navigation systems may include the transmission of encrypted satellite signals (typically reserved for governmental use) and non-encrypted satellite signals (typically available for civilian use). A known problem with the use of non-encrypted signals is the potential for a "spoofing" attack. The goal of a spoofing attack is to provide a receiver with misleading/incorrect information.

SUMMARY

In one aspect of the invention, a method is provided. The method comprises receiving, at a receiver, non-encrypted signals and encrypted signals from a plurality of satellites; determining location information for the receiver from the non-encrypted signals to generate non-encrypted location information; executing a semi-codeless technique to determine location information for the receiver from the encrypted signals to generate encrypted location information; and determining, based on the encrypted location information, whether the non-encrypted location information is accurate.

In another aspect of the present invention, a method is provided. The method comprises receiving, at a receiver in a satellite navigation system, non-encrypted signals and encrypted signals from a plurality of satellites; executing an at least semi-codeless technique to reconstruct one or more carrier signals associated with the encrypted signals; and determining, based on the one or more reconstructed carrier signals, whether the non-encrypted signals are authentic satellite signals transmitted by an authorized satellite in the satellite navigation system.

BRIEF DESCRIPTION OF THE DRAWINGS

Embodiments of the present invention are described herein in conjunction with the accompanying drawings, in which.

DETAILED DESCRIPTION

Embodiments presented herein are generally directed to anti-spoofing techniques for satellite navigation systems. The anti-spoofing techniques may be implemented in a number of different satellite navigation systems. However, merely for ease of illustration, the anti-spoofing techniques are described with reference to the United States NAVSTAR Global Positioning System (GPS).

Figure 1:
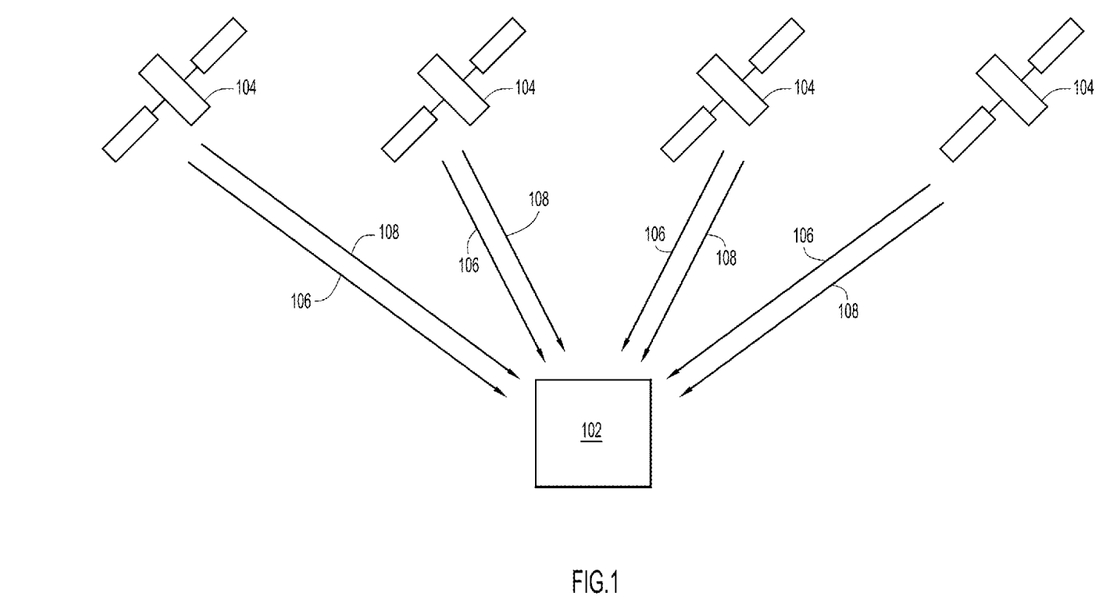
FIG. 1 is a block diagram of a satellite navigation system in which embodiments presented herein may be executed.

FIG. 1 is a schematic diagram of a portion of the GPS 100. As shown, the GPS 100 is a satellite navigation system comprised of a network of satellites 104 placed into orbit by the United States Department of Defense (DOD). The GPS provides location and time information to a GPS device (receiver) 102 anywhere on or near the Earth where there is an unobstructed line of sight to a plurality of (typically 4) GPS satellites 104. The GPS 100 was originally intended for military applications, but in the 1980s, the U.S. government made the system available for use by civilians.

Traditionally, the GPS 100 has operated using two codes referred to as the Coarse/Acquisition (C/A) code and the Precision (P) code. The C/A code is a non-encrypted code that is available for civilian use, while the P code is reserved for use by the military. The C/A code is a 1,023 bit deterministic sequence referred to as pseudorandom noise or a pseudorandom binary sequence (PN or PRN code) that, when transmitted at 1.023 megabits per second (Mbit/s), repeats every millisecond. Each satellite 104 transmits a unique PRN code that does not correlate well with PRN codes transmitted by other satellites.

The P code is also a PRN that, at each satellite, has a length of $6.1871 \times 1012$ bits (6,187,100,000,000 bits, ~720.213 gigabytes) that only repeats once a week (it is transmitted at 10.23 Mbit/s). Whereas C/A code PRNs are unique for each satellite, each of the P code PRNs are small segments of a master code approximately $2.35 \times 1014$ bits in length (235,000,000,000,000 bits, ~26.716 terabytes) and each satellite repeatedly transmits its assigned segment of the master code. To prevent unauthorized users from using or potentially interfering with the military signal, it was decided to encrypt the P code. To that end the P code is modulated with a special encryption sequence to generate the Y code. The encrypted P code is referred to as the P(Y) code. As such, the C/A code is sometimes referred to as a non-encrypted code, while the P(Y) code is sometimes referred to as an encrypted code.

For the GPS codes to travel from the GPS satellites 104 to the GPS device 102, the codes are modulated onto a carrier frequency. In the case of the original GPS design, a first frequency at 1575.42 MHz (L1) and a second frequency at 1227.60 MHz (L2) are used. The C/A code is transmitted on the L1 frequency as a 1.023 MHz signal using a bi-phase shift keying (BPSK) modulation technique. The P(Y) code is transmitted on both the L1 and L2 frequencies as a 10.23

MHz signal using the same BPSK modulation. The P(Y) code carrier is 90° out of phase from the C/A carrier. Modulated satellite signals that carry the C/A code are sometimes referred to as C/A signals or non-encrypted signals, while modulated satellite signals that carry the P(Y) code are sometimes referred to as P(Y) signals or encrypted signals. As shown in FIG. 1, each satellite 104 transmits non-encrypted (e.g., C/A) signals 106 and encrypted (e.g., P(Y)) signals 108 to a GPS device 102 within range of that satellite.

The United States government is also in the process of fielding three new codes, referred to as the L2C, L5, and L1C codes, designed for civilian use that may be used in combination with the C/A code. These new civilian signals are phasing in incrementally as the United States Air Force launches new GPS satellites to replace older ones. Additionally, the United States government is in the process of launching a new military signal referred to as the Military code (M-signal) designed to further improve the anti-jamming and secure access of the military GPS signals.

A known problem with the use of non-encrypted GPS signals (e.g., C/A signals or the new L2C, L5, and L1C codes) is the potential for a "spoofing" attack. The goal of a spoofing attack is to provide a GPS device with misleading/incorrect information. More specifically, a GPS spoofing attack involves the broadcast of spoofing signals to the GPS device that are slightly more powerful than the correct GPS signals received from the GPS satellites. The spoofing signals are structured to resemble a set of normal GPS signals, but are modified in such a way as to cause the GPS receiver to determine an incorrect time or to determine that it is positioned somewhere other than where it actually is located (e.g., at a location determined by the attacker).

A particularly sophisticated type of spoofing attack is one in which the attacker draws in genuine GPS signals to estimate target position, velocity, and time. Based on these estimates, the attacker generates spoofing signals that are slightly more powerful than the correct signals and that initially cause the GPS device to provide its correct position, time, etc. However, the spoofing signals are gradually adjusted over a period of time (e.g., in a manner that causes the attacked GPS device to adjust its clock rate and bias estimates) such that, eventually, the GPS device misidentifies the time, location, etc. In other words, this particular spoofing technique gradually "walks-off" the GPS signals such that the GPS device can no longer accurately determine, for example, the current time or current location. Instead, the GPS device identifies the current time or its current location as a time or location set by the attacker. This gradual walking-off of the GPS signals, referred to herein as a walking-off spoofing attack, is not detectable by conventional GPS devices.

Due to the encryption process, spoofing devices are unable to reconstruct and broadcast encrypted GPS signals (e.g., P(Y) signals). As such, devices that are able to use encrypted GPS signals are generally not at risk for a walking-off spoofing attack. However, as noted above, civilian devices are not able to decode encrypted GPS signals. Presented herein are anti-spoofing techniques that enable a civilian GPS device, such as GPS device 102, to use encrypted GPS signals 108, in a semi-codeless or codeless manner, to detect whether received non-encrypted signals are spoofing signals (i.e., counterfeit signals). In general, the anti-spoofing techniques use codeless or semi-codeless tracking of the encrypted GPS signals (e.g., L1 P(Y), L2 P(Y) signals, and/or other Military signals) to generate measurements, such as position, velocity, time (PVT), Doppler and/or other code estimates, that can be used to perform consistency checks to received non-encrypted signals (e.g., C/A signals). These consistency checks are used to determine whether the non-encrypted signal is a genuine satellite signal or a spoofing signal.

Figure 2:
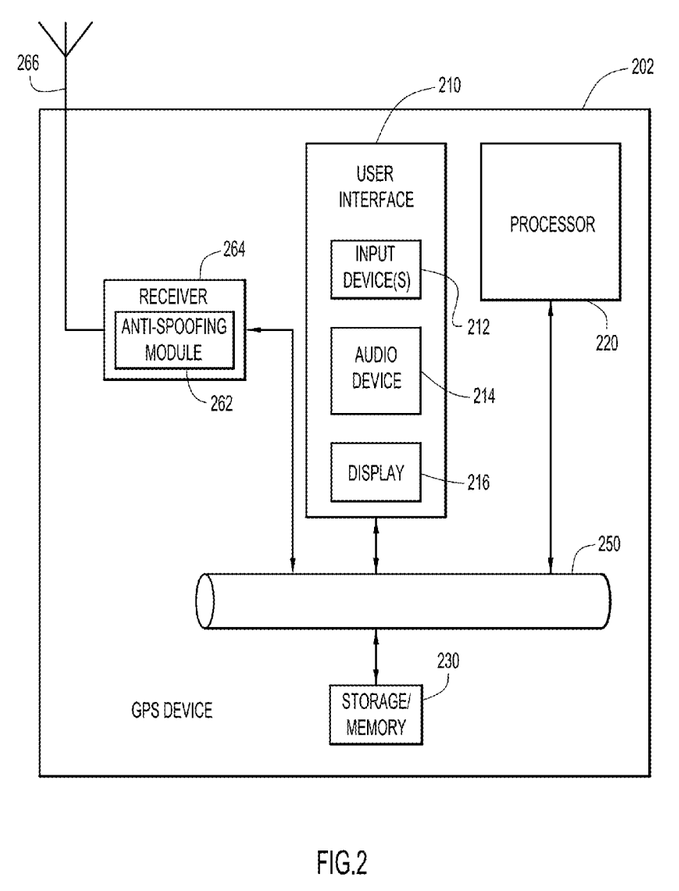
FIG. 2 is a schematic block diagram of a GPS device configured to execute anti-spoofing techniques in accordance with embodiments presented herein.

FIG. 2 is a block diagram of an example GPS device 202 that is configured to execute the anti-spoofing techniques presented herein. As used herein, a GPS device can be any device capable of receiving GPS signals, including but not limited to: fixed-position GPS receivers or other GPS capable devices (e.g., cellular base stations, utility grid controllers, etc.); handheld or body-mounted GPS receivers; any type of GPS capable phone (e.g., analog cellular, digital cellular, or satellite-based); any type of GPS capable computing devices (e.g., tablet computer, laptop computer, desktop computer, server, etc.); GPS receivers built into or embedded in a ground-based or airborne vehicle; a satellite-mounted receiver; or any other electronic device equipped with GPS reception capabilities.

As noted above, the embodiments presented herein are, merely for ease of illustration, described with reference to a GPS device. It is to be appreciated that the techniques may be used with devices operating in other satellite navigation systems.

The example GPS device 202 shown in FIG. 2 includes a GPS receiver 264 coupled to one or more antenna(s) 266 for reception of GPS signals from GPS satellites (FIG. 1). In certain embodiments, the GPS device 202 may also include a transmitter (not shown) that is capable of transmitting signals through the one or more antenna(s) 266.

GPS device 202 includes a user interface 210 that allows a user to interact with device 202. User interface 210 includes a display device 216, user input device(s) 212 (e.g., touch pad, input keys, a keypad/keyboard, etc.), and an audio device 214 (e.g., audio input and/or output). Display device 216 can be any of a wide variety of known devices, such as an LCD display. Input device(s) 212 allow the user to enter alphanumeric characters and can be configured as a physical device and/or as a keypad or buttons depicted on display device 216. In the latter case, buttons or keys can be selected by moving a cursor, or by touching the screen in the case of a touch-screen display. It will be appreciated that user interface 210 may include other types of user-input devices such as a cursor control device, joystick, etc.

GPS device 202 further includes a processing capability represented in FIG. 2 by processor 220. Processor 220 is capable of executing program instructions (i.e., software) for carrying out various operations and tasks. For example, processor 220 can interpret data and commands received from the receiver 264, perform computations, cause information to be stored, and control the display 216 of user interface 210. Processor 220 is, for example, a microprocessor, a microcontroller, a digital signal processor, etc.

A storage capability of device 202 is represented by storage/memory module 230, which can store information relating to the GPS signals (e.g., timing signals, timing packets, propagation delay, clock drift, as well as other data or information). Storage/memory module 230 can also store program instructions (i.e., software) to be executed by processor 220 to carry out operations.

As shown, GPS device 202 also comprises an anti-spoofing module 262 that is part of the GPS receiver 264. The anti-spoofing module 262 is configured to perform the GPS anti-spoofing techniques presented herein. More specifically, the anti-spoofing module 262 is configured to use encrypted GPS signals in a semi-codeless or codeless manner to detect whether received non-encrypted signals are spoofing signals (i.e., counterfeit signals). The anti-spoofing module 262 may be implemented in any combination of hardware and/or software. For example, in certain embodiments, the anti-spoofing module 262 is a fixed data processing element, such as an application specific integrated circuit (ASIC) that is configured, through fixed hardware logic, to perform the anti-spoofing functions described herein. In other embodiments, the anti-spoofing module 262 is implemented as one or more field programmable logic devices, or a combination of fixed processing elements and programmable logic devices.

In still other embodiments, the anti-spoofing module 262 is partially implemented as software (i.e., instructions) stored in memory 230 or another memory device. In such embodiments, the anti-spoofing operations and methodologies described herein can be carried out by executing instructions stored on a computer readable medium (i.e., software) on a processor or processors located within GPS device 202. As used herein, the term "computer readable medium" refers to tangible media (e.g., memory or storage devices). Storage/memory module 230 is a tangible processor-readable or computer-readable memory that stores or is encoded with instructions that, when executed by processor 220, cause processor 220 to perform the functions described herein.

The interconnections between the components of network-connected device 202 are represented generally in FIG. 2 with a bus structure 250. In general, user interface 210, processor 220, storage/memory module 230, anti-spoofing module 262, and receiver 264 can be interconnected in any suitable manner.

Figure 3:
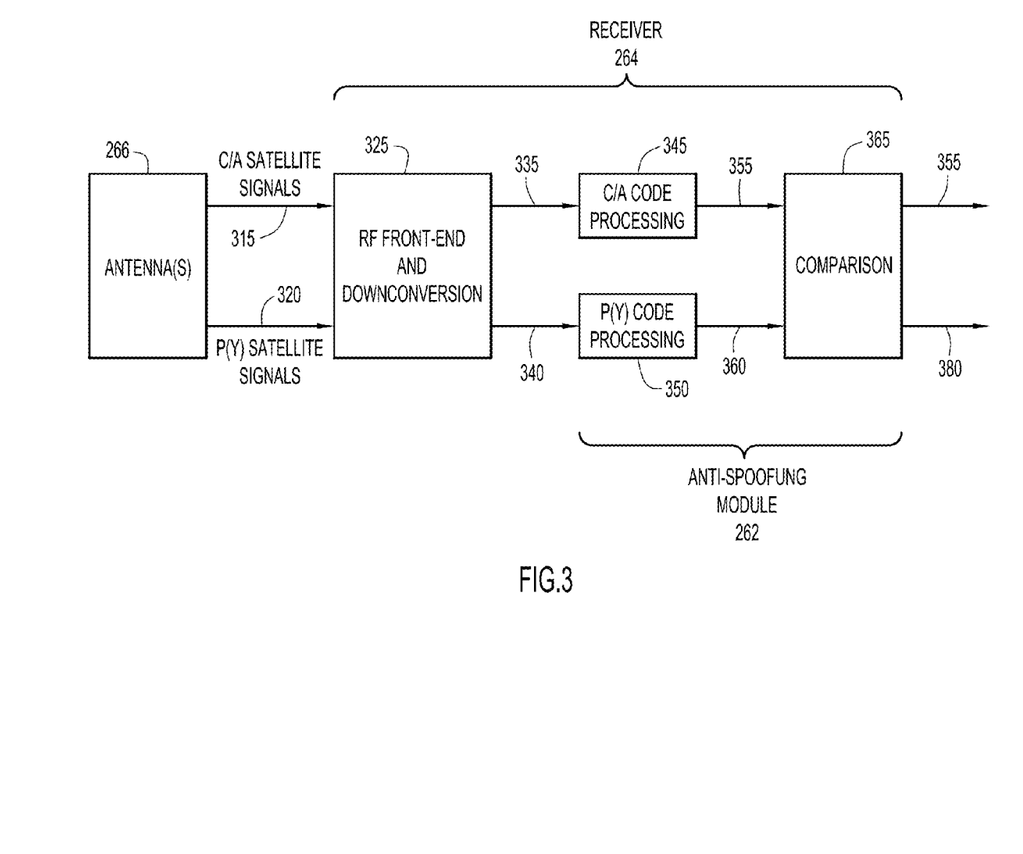
FIG. 3 is a functional block diagram of a GPS receiver to execute anti-spoofing techniques in accordance with embodiments presented herein.

FIG. 3 is a functional block diagram illustrating semi-codeless operations of anti-spoofing module 262 of receiver 264 in FIG. 2 to determine whether received C/A signals are authentic or counterfeit (i.e., spoofed). In the example of FIG. 3, C/A (non-encrypted) satellite signals 315 and P(Y) (encrypted) satellite signals 320 transmitted are received at the one or more antenna(s) 266 from a plurality of GPS satellites. That is, each of a plurality of satellites transmits C/A signals and P(Y) signals that are received by the antenna(s) 266. For ease of illustration, the C/A signals from all of the satellites are represented in FIG. 3 by arrow 315 and the P(Y) signals from all of the satellites are represented in FIG. 3 by arrow 320.

As shown, the C/A signals 315 and P(Y) signals 320 received at the one or more antenna(s) 266 are passed to the RF front end and down conversion block 325. The RF front end and down conversion block 325 down converts the L1 and/or L2 signals to baseband for subsequent processing. In the arrangement of FIG. 3, the RF front end and down conversion block 325 outputs C/A baseband signals 335 and P(Y) baseband signals 340.

The C/A baseband signals 335 are provided to a C/A code processing block 345 that is configured to, among other operations, generate pseudo-ranges from the C/A baseband signals 335. A pseudo-range is an approximation of the distance between a satellite and the GPS receiver 264. In certain examples, the GPS receiver 264 generates pseudo-ranges for at least four satellites as well as their positions when the satellites transmitted the positional data. With the satellites' orbital parameters supplied in the almanac within the message, each position can be calculated for any point in time.

In general, the C/A pseudo-ranges of each satellite are obtained by multiplying the time taken for each signal to reach the receiver 264 by the speed of light. Because accuracy errors exist in the measured time, the term pseudo-range, rather than simply range, is used. The GPS receiver 264 includes a clock (not shown) maintaining a time that is used to measure the ranges to several different satellites simultaneously. As such, all the measured pseudo-ranges have the same error. By finding the pseudo-range of a fourth satellite, the time error can also be estimated.

The C/A pseudo-ranges are used to determine position, velocity, and time (PVT) measurements for the receiver 264. These PVT measurements generated for the receiver 264 based on the C/A satellite signals 315 are referred to herein as C/A PVT measurements 355. As shown in FIG. 3, the C/A PVT measurements 355 are provided to a comparison block 365.

Returning to block 325, while the C/A baseband signals 335 are provided to a C/A code processing block 345, the P(Y) baseband signals 340 are provided to P(Y) code processing block 350. As noted above, the P(Y) code is an encrypted form of the military signal (i.e., the P-code) that prevents unauthorized users from using or potentially interfering with the military signal. The receiver 264 is a civilian receiver that does not possess the keys or processing necessary to decode the P(Y) code. However, the P(Y) code processing block 350 is configured to execute one or more semi-codeless techniques to generate pseudo-ranges from the P(Y) baseband signals 340.

A number of different semi-codeless techniques may be used to generate pseudo-ranges from the P(Y) baseband signals 340 without actually decoding the P(Y) signals. In certain examples, the semi-codeless techniques can be used to reconstruct the P(Y) carrier (e.g., L2) without knowledge of the special encryption sequence to generate the Y-code. In other examples, semi-codeless techniques rely upon a priori knowledge of the relationship of the encryption sequence to the P-code Semi-codeless techniques that may be used in accordance with embodiments presented herein include, for example, (1) a code-aided L2 Costas loop with W-Bit integrate and dump arm filtering; (2) P-code aided L1, L2 Cross Correlation; (3) Soft decision Z-tracking; (4) Optimum L2 demodulation motivated by maximum a posteriori (MAP) estimation theory; or (5) Linear approximation of the MAP approach. Further details of these semi-codeless techniques are described in K. T. Woo, "Optimum Semi-Codeless Carrier Phase Tracking of L2," NAVIGATION, Journal of The Institute of Navigation, Vol. 47, No. 2, Summer 2000, pp. 82-99 (hereinafter, "Woo"), the content of which is hereby incorporated by reference herein.

The P(Y) pseudo-ranges generated using one of the above or other semi-codeless techniques are used to determine position, velocity, and time (PVT) measurements for the receiver 264. These PVT measurements generated for the receiver 264 based on the P(Y) satellite signals 320 are referred to herein as PVT measurements 360. As shown in FIG. 3, the P(Y) PVT measurements 360 are provided to a comparison block 365. In summary of the above, C/A PVT measurements 355 and P(Y) PVT 360 are generated by blocks 345 and 350, respectively, and are provided to comparison block 365.

The United States D.O.D. has also implemented an anti-spoofing process with the P(Y) signals which is intended to prevent a terrorist or enemy from generating a signal which looks like a P(Y) GPS signals. As such, although spoofing is a problem with the C/A code (i.e., there is nothing preventing the generation of a signal that looks like a C/A signal), spoofing is generally not a concern with the P(Y) signals. The techniques of FIG. 3 rely on the general legitimacy of the P(Y) signals as a validity check of the C/A PVT measurements 355.

More specifically, the comparison block 365 is configured to compare the independent C/A and P(Y) PVT measurements to determine whether they are substantially same. When the C/A PVT measurements 355 are substantially the same as the P(Y) PVT measurements 360, the comparison block 365 may conclude that the C/A PVT measurements 355 are authentic and that the C/A satellite signals 315 received at the one or more antenna(s) 266 have not been spoofed. As shown in FIG. 3, when the C/A PVT measurements 355 are determined to be authentic, the C/A PVT measurements may be output by the receiver 264 for subsequent use by other elements of the GPS device 202 (FIG. 2).

However, when the C/A PVT measurements 355 are not substantially the same as the P(Y) PVT measurements 360, the comparison block 365 may conclude that the C/A PVT measurements 355 are not authentic and that the C/A satellite signals 315 received at the antenna(s) 266 have not been spoofed. In other words, the comparison block 365 may determine that the receiver 264 is positioned at a location that is different from that indicated by the C/A PVT measurements 355, the actual time is different from that indicated by the C/A PVT measurements 355, etc.

In certain embodiments, the difference(s) between the C/A PVT measurements 355 and the P(Y) PVT measurements 360 are compared to a predetermined threshold. When the difference(s) are below the threshold, the C/A PVT measurements 355 may be determined to be authentic. When the difference(s) are above the threshold, the C/A PVT measurements 355 may be determined to be inaccurate (i.e., that the C/A satellite signals 315 received at the antenna(s) 266 have been spoofed).

When the comparison block 365 determines that the C/A PVT measurements 355 are not authentic, the comparison block 365 may generate a warning or notice 380 to other elements of the GPS device 202 (FIG. 2). The comparison block 365 may also block the C/A PVT measurements 355 from being used by other elements of the GPS device 202. In certain embodiments, the comparison block 365 may, in place of the C/A PVT measurements 355, provide the P(Y) PVT measurements to other elements of the GPS device 202 for temporary use in determining position, time, etc.

FIG. 3 generally illustrates the use of a semi-codeless tracking technique to generate pseudo-ranges from the P(Y) signals for subsequent generation of P(Y)-specific PVT measurements for comparison to C/A-specific PVT measurements. It is to be appreciated that other embodiments may implement a codeless technique rather than a semi-codeless technique to track aspects of the P(Y) signal. In the codeless techniques, the P(Y) code processing block 350 does not generate pseudo-ranges from the P(Y) signals for subsequent generation of P(Y)-specific PVT measurements. Instead, the P(Y) code processing block 350 is configured to generate frequency and/or phase information from the P(Y) signal carrier (e.g., L2). This frequency and/or phase information may then be provided to the comparison block 365 for comparison to frequency and/or phase information generated from the C/A carrier. Again, differences in frequency and/or phase may indicate that one or more of the C/A satellite signals 315 have been spoofed and that the C/A PVT measurements are not authentic.

A number of different codeless techniques may be used to generate frequency and/or phase information from the P(Y) baseband signals 340 without actually decoding the P(Y) signals (i.e., without knowledge of the Y code). In one embodiment, a semi-squaring codeless technique may be used. Other codeless techniques that may be used in accordance with embodiments presented herein include, for example, (1) signal squaring, (2) cross-correlation, P-code aiding squaring, Z-tracking, etc. Further details of these codeless techniques are described in the non-patent reference Woo, cited above.

Figure 4:
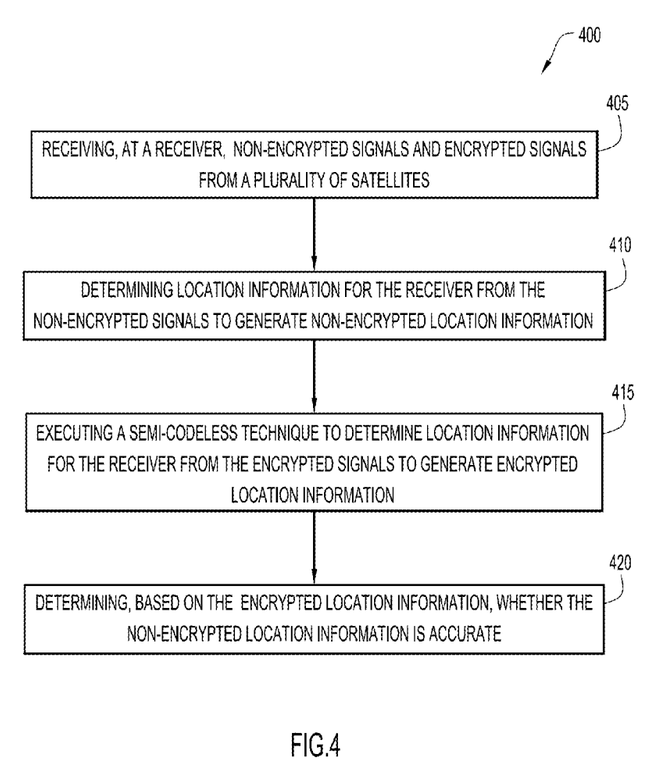
FIG. 4 is a flowchart of an anti-spoofing method in accordance with embodiments presented herein.

FIG. 4 is a flowchart of a method 400 in accordance with embodiments presented herein. The method 400 begins at 405 where a receiver (e.g., timing receiver, a receiver that is part of a communication device, etc.) in a satellite navigation system receives non-encrypted signals and encrypted signals from a plurality of satellites in the satellite navigation system. At 410, location information for the receiver is determined from the non-encrypted signals. This location information (e.g., PVT measurements) is generated from the non-encrypted signals and, as such, is referred to as non-encrypted location information.

At 415, a semi-codeless technique is executed to determine location information for the receiver from the encrypted signals. This location information is generated from the encrypted signals and, as such, is referred to as encrypted location information. At 420, the encrypted location information is used to determine whether the non-encrypted location information is accurate.

In accordance with embodiments presented herein, determining whether the non-encrypted location information is accurate comprises determining a difference between the encrypted location information and the non-encrypted location information. In certain embodiments, the difference between the encrypted location information and the non-encrypted location information is compared to a predetermined threshold such that a difference that is greater than the threshold indicates that the non-encrypted location information is not accurate.

Figure 5:
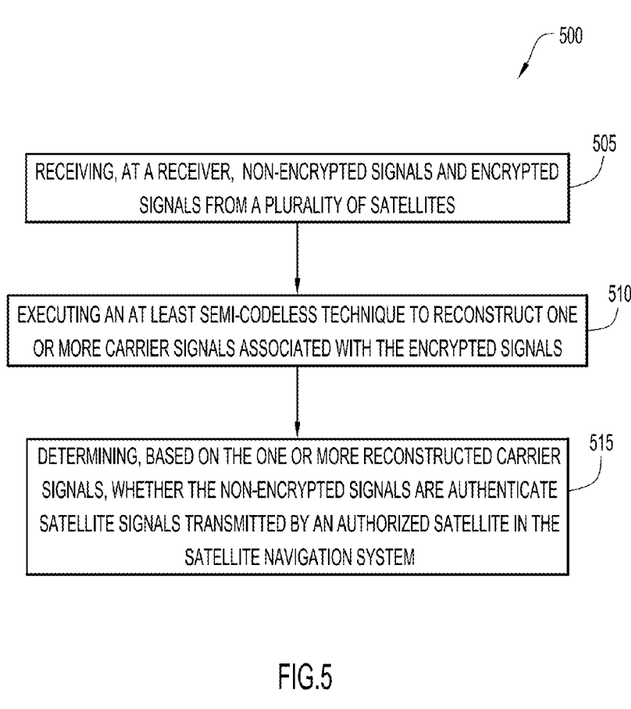
FIG. 5 is a flowchart of an anti-spoofing method in accordance with embodiments presented herein.

FIG. 5 is a flowchart of a method 500 in accordance with embodiments presented herein. The method 500 begins at 505 where a receiver in a satellite navigation system receives non-encrypted signals and encrypted signals from a plurality of satellites in the satellite navigation system. At 510, an at least semi-codeless technique (i.e., one of a semi-codeless or a fully codeless technique) is executed to reconstruct one or more carrier signals associated with the encrypted signals. At 515, the one or more reconstructed carrier signals are used to determine whether the non-encrypted signals are authentic satellite signals transmitted by an authorized satellite in the satellite navigation system.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method comprising:
   receiving, at a receiver, non-encrypted signals and encrypted signals from a plurality of satellites;
   determining location information for the receiver from the non-encrypted signals to generate non-encrypted location information;
   executing a semi-codeless technique to determine location information for the receiver from the encrypted signals to generate encrypted location information; and determining, based on the encrypted location information, a difference between the encrypted location information and the non-encrypted location information.

2. The method of claim 1, further comprising:
comparing the difference between the encrypted location information and the non-encrypted location information to a predetermined threshold,
wherein a difference that is greater than the threshold indicates that the non-encrypted location information is not accurate.

3. The method of claim 1, wherein determining location information for the receiver from the non-encrypted signals comprises:
determining position, velocity, and time measurements (PVT) measurements for the receiver using the non-encrypted signals.

4. The method of claim 3, wherein determining location information for the receiver from the encrypted signals comprises:
determining PVT measurements for the receiver from a carrier signal associated with the encrypted signals.

5. The method of claim 1, wherein the receiver is a Global Positioning System (GPS) receiver, the non-encrypted signals are Coarse/Acquisition (C/A) code signals, and the encrypted signals are Precision (P) code signals forming P(Y) signals.

6. The method of claim 1, wherein the receiver is a timing receiver.

7. An apparatus, comprising:
one or more antennas;
a receiver coupled to the one or more antennas configured to:
receive, via the one or antennas, non-encrypted signals and encrypted signals from a plurality of satellites;
determine location information for the receiver from the non-encrypted signals to generate non-encrypted location information;
execute a semi-codeless technique to determine location information for the receiver from the encrypted signals to generate encrypted location information; and
determine, based on the encrypted location information, a difference between the encrypted location information and the non-encrypted location information.

8. The apparatus of claim 7, wherein the receiver is further configured to:
compare the difference between the encrypted location information and the non-encrypted location information to a predetermined threshold,
wherein a difference that is greater than the threshold indicates that the non-encrypted location information is not accurate.

9. The apparatus of claim 7, wherein to determine location information for the receiver from the non-encrypted signals, the receiver is configured to:
determine position, velocity, and time measurements (PVT) measurements for the receiver using the non-encrypted signals.

10. The apparatus of claim 9, wherein to determine location information for the receiver from the encrypted signals, the receiver is configured to:
determine PVT measurements for the receiver from a carrier signal associated with the encrypted signals.

11. The apparatus of claim 7, wherein the receiver is a Global Positioning System (GPS) receiver, the non-encrypted signals are Coarse/Acquisition (C/A) code signals, and the encrypted signals are Precision (P) code signals forming P(Y) signals.

12. The apparatus of claim 7, wherein the receiver is a timing receiver.

13. One or more non-transitory computer readable storage media encoded with software comprising computer executable instructions and when the software is executed operable to:
receive at a receiver, non-encrypted signals and encrypted signals from a plurality of satellites;
determine location information for the receiver from the non-encrypted signals to generate non-encrypted location information;
execute a semi-codeless technique to determine location information for the receiver from the encrypted signals to generate encrypted location information; and
determine, based on the encrypted location information, a difference between the encrypted location information and the non-encrypted location information.

14. The non-transitory computer readable storage media of claim 13, further comprising instructions operable to:
compare the difference between the encrypted location information and the non-encrypted location information to a predetermined threshold,
wherein a difference that is greater than the threshold indicates that the non-encrypted location information is not accurate.

15. The non-transitory computer readable storage media of claim 13, wherein the instructions operable to determine location information for the receiver from the non-encrypted signals comprise instructions operable to:
determine position, velocity, and time measurements (PVT) measurements for the receiver using the non-encrypted signals.

16. The non-transitory computer readable storage media of claim 15, wherein the instructions operable to determine location information for the receiver from the encrypted signals comprise instructions operable to:
determine PVT measurements for the receiver from a carrier signal associated with the encrypted signals.

* * * * *